United States Patent Office 3,334,990
Patented Aug. 8, 1967

3,334,990
METHOD FOR INHIBITING GROWTH OF
UNDESIRABLE PLANTS
Werner Schäfer, Cologne-Stammheim, Richard Wegler, Leverkusen, Ludwig Eue, Cologne-Stammheim, and Helmuth Hack, Leverkusen, Germany, assignors to Farbenfabriken Bayer Aktiengesellschaft, Leverkusen, Germany, a Germany corporation
No Drawing. Filed Aug. 30, 1963, Ser. No. 305,824
Claims priority, application Germany, Sept. 29, 1962,
F 37,927
12 Claims. (Cl. 71—88)

The present invention relates to the use of partly known acyl-2-amino-benzoxazoles-(1,3) and acyl-2-amino-benzothiazoles-1,3 as herbicidal active substances.

It has been found that compounds of the formula

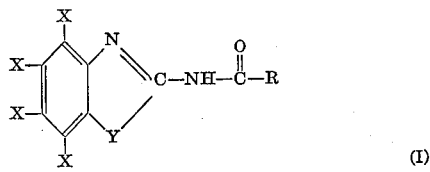

wherein

R stands for hydrogen or an aliphatic radical with 1 to 6 carbon atoms which may be substituted by halogen and/or alkoxy,
X stands for hydrogen, halogen or alkyl with 1 to 2 carbon atoms, and
Y stands for oxygen or sulphur, possess strong heribicidal properties.

It is surprising that the above active substances show good herbicidal activity, since it is not known from the literature that compounds having similar chemical structure exhibit such property. It is especially surprising that the present compounds possess strong selective herbicidal properties and are useful for example, in combating weeds in a corn field.

The substances to be used according to the present invention are characterised by Formula I, as above defined. In this Formula R stands preferably for alkyl having 1 to 6 carbon atoms and alkenyl having 2 to 6 carbon atoms. These radicals may be substituted by chlorine, bromine, fluorine and/or alkoxy of 1 to 4 carbon atoms. X is preferably defined as hydrogen, chlorine, bromine, fluorine and alkyl of 1 to 2 carbon atoms. The substances to be used according to the invention are acyl derivatives of 2-amino-benzoxazole-1,3 and acyl derivatives of 2-amino-benzothiazole-1,3.

Some of the products to be used according to the invention are known. The hitherto unknown products, however can be prepared in good yields in a simple manner by acylation of the known 2-amino-benzothiazole or the known 2-amino-benzoxazole. These methods of production involve only an acylation of the amino group. Acid halides, acid anhydrides, esters or other reactive acid derivatives can be used as acylating agents.

Examples of substances used as pest control agents include: N-propionyl-2-amino-benzothiazole, N-methoxyacetyl-2-amino-5-chlorobenzothiazole, N-methoxyacetyl-2-amino-5-chlorobenzoxazole, N-propionyl-2-aminobenzoxazole as well as the isobutyryl, acryl, methacryl and chloroacetyl derivatives of 2-amino-benzothiazole and 2-aminobenzoxazole.

Since the active substances affect plant growth they can be used as defoliants, desiccants, herb killers, germination inhibitors and, particularly as weed killers. The term weeds, as herein used, may include a variety of plants which grow in places where they are undesirable. Whether the substances according to the invention act as total or selective heribicides, depends essentially on the amount employed.

The active substances can be used, for example, against the following plants: dicotelydons such as mustard (sinapis), cress (lepidium), catch weed (galium), chickweed (stellaria), camomile (matricaria), French weed (galinsoga), goose-foot (chenopodium), stinging nettle (urtica), groundsel (senecio), cotton (gossypium) beet (beta), carrots (daucus), beans (phaseolus), potatoes (solanum) coffee (coffea); monocotyledons, such as cat's tail (phleum), meadow-grass (poa), fescue grass (festuca, eleusine (eleusine), bristle-grass (setaria), ray grass loliurn) brome grass (bromus), chicken millet (echinochloa), maise (zea), rice (oryza), oats (avena), barley (hordeum), wheat (triticum), millet (panicum), sugar cane (saccharum).

The plant species indicated above are merely representative examples of the genera given in Latin. The use of the inventive substances, however, is not limited to these specific genera; it may apply equally well to other plants.

The active substances can be applied as such or in the usual formulations, such as emulsifiable concentrates, spray powders, pastes, soluble powders, dusts and granulates. These may be prepared in known manner (cf. Agricultural Chemicals, March 1960, pages 35–38). Auxiliaries suitable for this purpose include solvents such as aromatics (e.g. xylene, benzene) chlorinated aromatic (e.g. chlorobenzenes), paraffins (e.g. petroleum fractions), alcohols (e.g. methanol, butanol), amines (e.g. ethanolamine, dimethyl formamide) and water; carrier substances such as natural rock flours (e.g. kaolins, clays, talc, chalk) and synthetic rock flours (e.g. highly disperse silicic acid, silicates); emulsifiers, such as non-ionic and anionic emulsifiers (e.g. polyoxyethylene-fatty acid esters, polyoxyethylene-fatty alcohol ethers, alkyl sulphonates and aryl sulphonates) and dispersing agents, such as lignin, sulphite waste liquors and methyl cellulose.

The active substances according to the invention can also be present in the formulations in admixture with other known active substances.

In general, the formulations contain between 0.1 and 95, preferably between 0.5 and 90 percent by weight of active substance.

Our substances or their formulations are applied in usual manner, i.e. by pouring, spraying, scattering and dusting. The application can be carried out before or after the germination of the cultivated plants.

The substances according to the invention are preferably used in the form of emulsions. These spray emulsions are prepared by pre-dissolving the active substance in acetone and stirring this solution, after addition of an emulsifier (e.g. o-benzyl-diphenyl-monohydroxy-polyglycol ether), with sufficient water to attain the desired concentration of active substance.

The following examples are given for the purpose of illustrating the invention.

Example 1

The cultivated plants and the weeds listed below are sprayed with an emulsion of 0.4% of N-propionyl-2-amino-benzothiazole. After 14 days, the degree of damage to the plants is evaluated according to appearance.

| Species | State of development at the time of spraying | Degree of damage |
|---|---|---|
| Panicum spec | 3-leaves stage | 5 |
| Panicum spec | 5-leaves stage | 5 |
| Solanum lycopersicum | 15 cm. height | 5 |
| Chenopodium album | 7 cm. height | 5 |
| Avena fatua | 2-3 leaves stage | 4-5 |
| Sinapis arvensis | 1st pair of leaves | 5 |
| Stellaria media | 5 cm. 1st flowers | 5 |
| Senicio vulgaris | 8 cm | 5 |
| Galinsoga paviflora | 10 cm | 5 |
| Phaseolus vulgaris | 2nd pinnate leaf | 4-5 |

Meaning of the numbers indicating the degree of damage:

0 = no effect
1 = some slight burns
2 = leaves distinctly damaged
3 = some leaves and stalk parts partly dead
4 = plant partly destroyed
5 = plant completely dead.

At a sufficiently high concentration N-propionyl-2-amino-benzothiazole is suitable for the destruction of plant growth.

Example 2

The weeds and cultivated plants listed below are sprayed with 0.2% and 0.1% emulsions of N-propionyl-2-amino-benzothiazole. After 14 days the degree of damage is evaluated according to appearance.

| Species | State of development | Degree of damage | | |
|---|---|---|---|---|
| | | 0.05 | 0.1 | 0.2 |
| Oryza sativa | 3-leaves stage | 0 | 1-2 | 2 |
| | 4-5-leaves stage | 0 | 1 | 1-2 |
| | 6-leaves stage | 0 | 1 | 1 |
| Echinochloa crus galli | 3-leaves stage | 4-5 | 5 | 5 |
| | 4-leaves stage | 4-5 | 5 | 5 |
| | 5-leaves stage | 5 | 5 | 5 |
| Triticum aestivum | 3-leaves stage | 0 | 0 | 0 |
| Avena sativum | 3-leaves stage | 0 | 1 | 1 |
| Sinapis arvensis | 1st pair of leaves | 3-4 | 5 | 5 |

As can be seen from the preceding table, N-propionyl-2-amino-benzothiazole is suitable for the selective control of weeds in corn fields. A surprising feature is the good action against *Echinochloa crus galli*, a rice weed which is spread over the whole globe.

Example 3

Post-emergence test:

Solvent—acetone, 10 parts by weight
Emulsifier—5 parts by weight

In order to prepare a suitable preparation of active substance, 1 part by weight of active ingredient is mixed with the stated amount of solvent, the indicated amount of emulsifier is added, and the concentrate is then diluted with water to the desired concentration.

Test plants which have a height of about 5–15 cm. are sprayed with the preparation of active substance, until just dew-moist. After three weeks, the degree of damage to the plants is determined and designated by the characteristics 0–5 which have the following meaning:

0 = no effect
1 = some slight burns
2 = leaves distinctly damaged
3 = some leaves and stalk parts partly dead
4 = plant partly destroyed
5 = plant completely dead.

The active substances, their concentrations and the results can be seen from the following table:

TABLE—POST-EMERGENCE-TEST

| No. | Active substance | Conc. of active substance in percent | Millet | Beet | Oats | Cotton | Wheat | Mustard | Tomatoes | Beans |
|---|---|---|---|---|---|---|---|---|---|---|
| 1 | CH$_2$Cl—CH$_2$—CO—NH—C(benzothiazole) | 0.4 | 4 | 4 | 2 | 0 | 0 | 1 | 0 | 0 |
| 2 | CHO—NH—C(benzothiazole) | 0.4 | 2 | 2 | 0 | 0 | 1 | 0 | 0 | 0 |
| 3 | CH$_2$Cl—CO—NH—C(benzothiazole) | 0.4 | 2 | 2 | 0 | 0 | 2 | 1 | 0 | 0 |
| 4 | CCl$_3$—CO—NH—C(benzothiazole) | 0.4 | 2 | 3 | 0 | 1 | 2 | 5 | 1 | 2 |
| 5 | CHCl$_2$—CO—NH—C(benzothiazole) | 0.4 | 4 | 1 | 1 | 0 | 1 | 3 | 1 | 0 |

TABLE—POST-EMERGENCE-TEST—Continued

| No. | Active substance | Conc. of active substance in percent | Millet | Beet | Oats | Cotton | Wheat | Mustard | Tomatoes | Beans |
|---|---|---|---|---|---|---|---|---|---|---|
| 6 | (CH₃)₂CH—C(=O)—NH—C(benzothiazole) | 0.4 / 0.2 / 0.1 / 0.05 | 5 / 5 / 4-5 / 4 | 5 / 4 / 3 / 2 | 5 / 4 / 3 / 2 | 4 / 3 / 2 / 2 | 2 / 1 / 0 / 0 | 5 / 5 / 5 / 5 | 5 / 5 / 4-5 / 4 | 5 / 5 / 5 / 5 |
| 7 | CH₃—CH₂—CH₂—CH(CH₃)—C(=O)—NH—C(benzothiazole) | 0.2 / 0.1 / 0.05 | 4 / 3 / 2 | 4 / 3 / 2 | 4 / 3 / 2 | 0 / 0 / 0 | 4 / 3 / 1 | 5 / 5 / 5 | — / — / — | 4 / 3 / 2 |
| 8 | CH₃—C(=O)—NH—C(benzothiazole) | 0.4 | 3 | 3 | 1 | 1 | 1 | 2 | 4 | 3 |
| 9 | C₂H₅—C(=O)—NH—C(benzothiazole, Cl, Cl) | 0.4 | 0 | 0 | 3 | 0 | 0 | 5 | 0 | 0 |
| 10 | C₂H₅—C(=O)—NH—C(benzothiazole, Cl) | 0.4 | 1 | 0 | 2 | 0 | 1 | 3 | 0 | 0 |

We claim:

1. A method for inhibiting growth of undersirable plants which comprises treating said plants with a phytotoxic amount of a compound of the formula

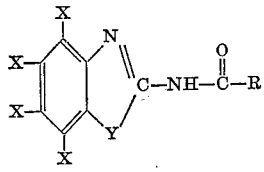

wherein
R is a member selected from the group consisting of hydrogen, alkyl having from 1–6 carbon atoms, alkenyl, of 1–2 carbon atoms, methoxymethyl-, and chloromethyl-, chloroethyl-, dichloromethyl-, trichloromethyl-;
X is a member selected from the group consisting of hydrogen and chloro-; and
Y is a member selected from the group consisting of oxygen and sulfur.

2. A method for inhibiting growth of undesirable plants which comprises treating said plants with a phytotoxic amount of N-propionyl-2-amino-benzothiazole.

3. A method for inhibiting growth of undesirable plants which comprises treating said plants with a phytoxic amount of N-chloropropionyl-2-amino-benzothiazole.

4. A method for inhibiting growth of undesirable plants which comprises treating said plants with a phytotoxic amount of N-chloroacetyl-2-amino-benzothiazole.

5. A method for inhibiting growth of undesirable plants which comprises treating said plants with a phytotoxic ampunt of N-dichloroacetyl-2-amino-benzothiazole.

6. A method for inhibiting growth of undesirable plants which comprises treating said plants with a phytotoxic amount of a N-trichloroacetyl-2-amino-benzothiazole.

7. A method for inhibiting growth of undesirable plants which comprises treating said plants with a phytotoxic amount of a N-formyl-2-amino-benzothiazole.

8. A method for inhibiting growth of undesirable plants which comprises treating said plants with a phytotoxic amount of a N-butyryl-2-amino-benzothiazole.

9. A method for inhibiting growth of undesirable plants which comprises treating said plants with a phytotoxic amount of a N-caproyl-2-amino-benzothiazole.

10. A method for inhibiting growth of undesirable plants which comprises treating said plants with a phytotoxic amount of a N-acetyl-2-amino-benzothiazole.

11. A method for inhibiting growth of undesirable plants which comprises treating said plants with a phytotoxic amount of a N-propionyl-2-amino-4,5,6,7-tetrachloro-benzothiazole.

12. A method for inhibiting growth of undesirable plants which comprises treating said plants with a phytotoxic amount of a N-propionyl - 2 - amino-5-chloro-benzoxazole.

References Cited

UNITED STATES PATENTS

| | | | |
|---|---|---|---|
| 1,961,840 | 6/1934 | Bolton | 167—33 |
| 2,653,865 | 9/1953 | Kosmin et al. | 71—2.5 |
| 2,756,135 | 7/1956 | Searle | 71—2.5 |
| 2,833,689 | 5/1958 | Gerjovich | 260—305 |
| 3,162,644 | 12/1964 | Englisch et al. | 71—2.5 |

FOREIGN PATENTS 930,306   7/1963   Great Britain.

OTHER REFERENCES

Bhargova et al.: Chemical Abstract, Vol. 62, col. 16228 (C) (1965).

Harsayni et al.: Chemical Abstract, Vol. 62, col. 10424 (F) (1965).

LEWIS GOTTS, *Primary Examiner.*

JAMES O. THOMAS, *Examiner.*